(12) United States Patent
Gausrab

(10) Patent No.: US 10,851,891 B2
(45) Date of Patent: Dec. 1, 2020

(54) SHIFT DRUM ARRANGEMENT

(71) Applicant: Dr. Ing. h.c. F. Porsche Aktiengesellschaft, Stuttgart (DE)

(72) Inventor: Klaus Gausrab, Tiefenbronn (DE)

(73) Assignee: Dr. Ing. h.c. F. Porsche Aktiengeslellschaft (DE)

(*) Notice: Subject to any disclaimer, the term of this patent is extended or adjusted under 35 U.S.C. 154(b) by 672 days.

(21) Appl. No.: 15/676,287

(22) Filed: Aug. 14, 2017

(65) Prior Publication Data
US 2018/0045305 A1 Feb. 15, 2018

(30) Foreign Application Priority Data
Aug. 15, 2016 (DE) .................. 10 2016 115 078

(51) Int. Cl.
| F16H 61/18 | (2006.01) |
| F16H 53/02 | (2006.01) |
| F16H 63/18 | (2006.01) |
| F16H 63/34 | (2006.01) |
| F16H 61/00 | (2006.01) |

(52) U.S. Cl.
CPC .......... *F16H 61/18* (2013.01); *F16H 53/025* (2013.01); *F16H 61/0059* (2013.01); *F16H 63/18* (2013.01); *F16H 63/3416* (2013.01)

(58) Field of Classification Search
CPC ...... F16H 61/18; F16H 61/0059; F16H 63/18; F16H 63/3416
USPC ....................................... 74/337.5
See application file for complete search history.

(56) References Cited

U.S. PATENT DOCUMENTS

| 6,997,073 | B2* | 2/2006 | Hattori .................. F16H 3/089 123/198 E |
| 7,779,977 | B2* | 8/2010 | Chen ..................... F16H 63/18 192/3.56 |
| 9,440,625 | B2* | 9/2016 | Marklen ............ F16H 63/3433 |
| 9,482,340 | B2* | 11/2016 | Bunder .................. F16H 61/68 |
| 10,443,722 | B2* | 10/2019 | Esser ..................... F16H 63/38 |

FOREIGN PATENT DOCUMENTS

| DE | 708872 C | 7/1941 |
| DE | 19509477 A1 | 9/1996 |
| DE | 10203633 A1 | 9/2003 |
| DE | 102005000887 A1 | 8/2005 |
| EP | 1118803 A2 | 7/2001 |

OTHER PUBLICATIONS

German Search Report with partial English language translation for Application No. 10 2016 115 078.9, dated Apr. 7, 2017, 7 pages.
Chinese Office Action for Chinese Application No. 2017106844657, dated Nov. 29, 2018, 7 pages.

* cited by examiner

*Primary Examiner* — Ha Dinh Ho
(74) *Attorney, Agent, or Firm* — RatnerPrestia

(57) ABSTRACT

A shift drum arrangement includes a shift drum with at least one first shift gate and/or a shift drum path for actuating at least one shift element of a transmission, in particular of a motor vehicle. A blocking device has a blocking gate and a blocking pin which engages in the blocking gate. The blocking gate has a labyrinth contour, and therefore the blocking pin strikes against a stop contour in one direction of rotation of the shift drum and blocks the further rotation of the shift drum. The block is released after the shift drum is partially rotated back in the reverse direction of rotation.

10 Claims, 6 Drawing Sheets

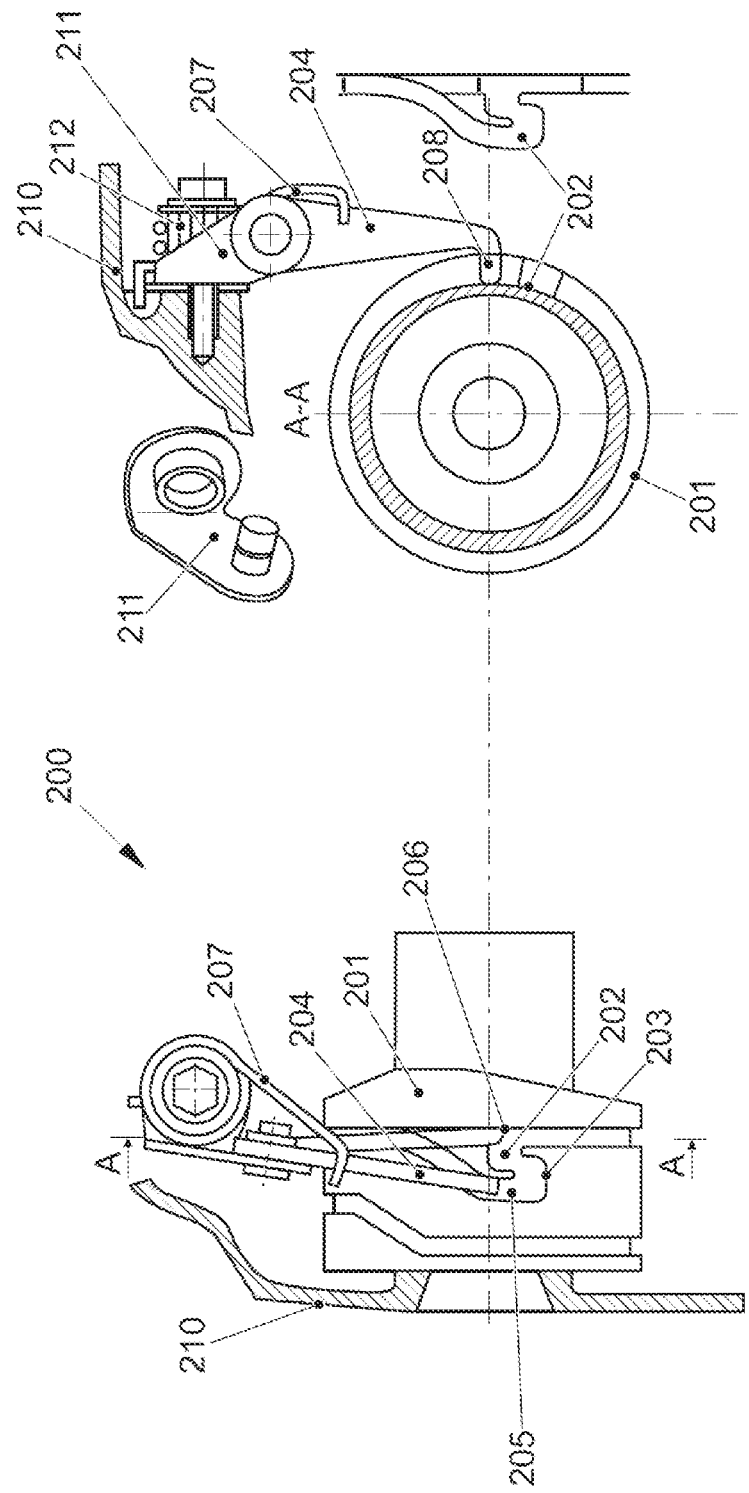

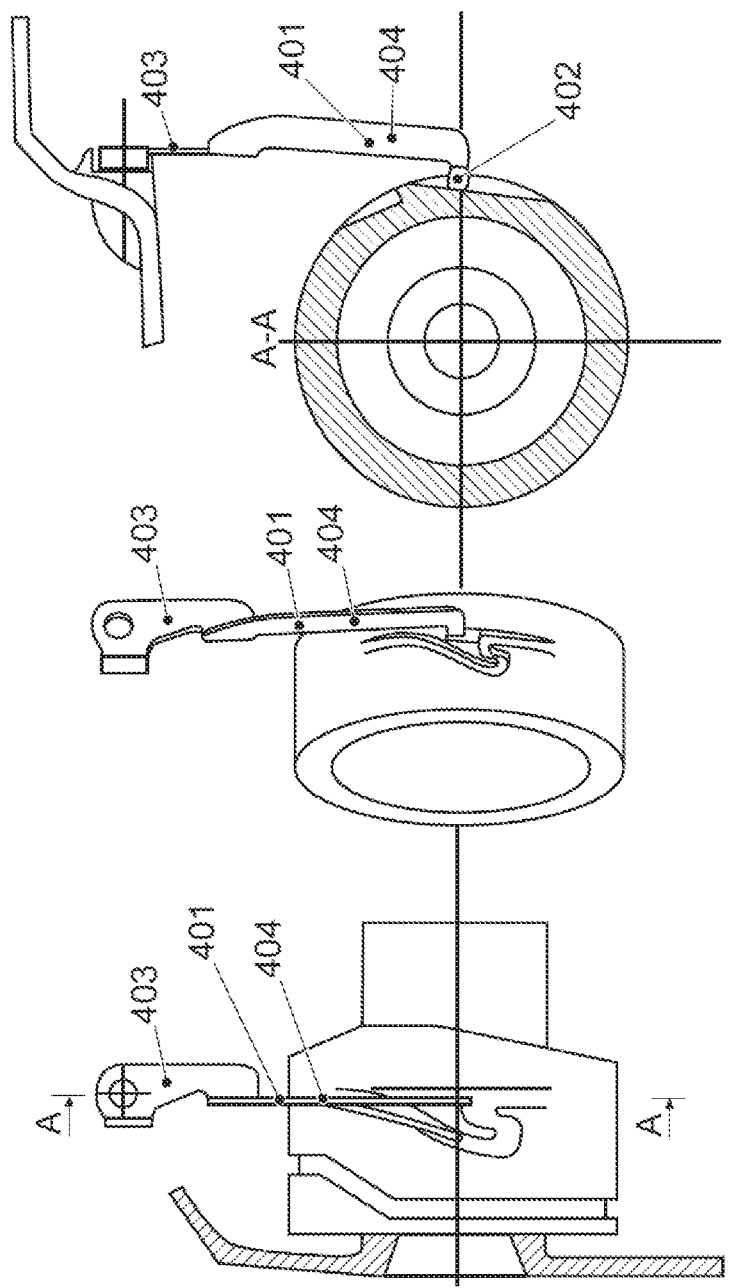

SHIFT DRUM ARRANGEMENT

CROSS-REFERENCE TO RELATED APPLICATION

Figure 1:
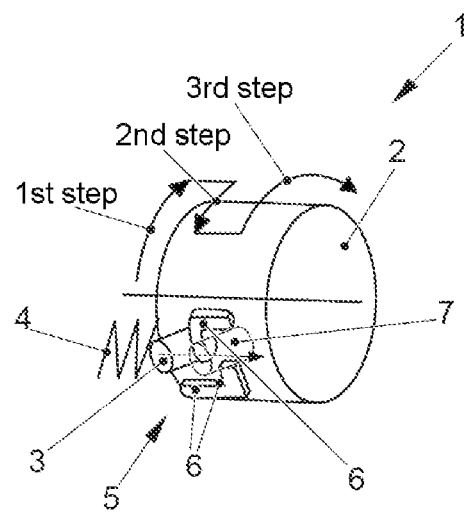

This application claims priority to German Patent Application No. DE 10 2016 115 078.9, filed Aug. 15, 2016, the contents of such application being incorporated by reference herein in its entirety.

FIELD OF THE INVENTION

The invention relates to a shift drum arrangement, in particular for motor vehicles.

BACKGROUND OF THE INVENTION

Shift drum arrangements in motor vehicles and in particular also in electric or hybrid vehicles with an electric motor and with an internal combustion engine as the drive are provided with a parking brake which is engaged via a transmission with a shift drum arrangement so that the vehicle cannot roll away in the parked state. At least one axle of the vehicle is blocked here, and the vehicle cannot roll away or be rolled away.

If, for example, the transmission is a two-speed automatic transmission which is used for an electrically driven vehicle, the shift element for the first gear can be, for example, an overrunning clutch which can be shifted via a dog clutch. The shift element for the second gear here can be a friction clutch which is opened via the shift drum arrangement and is closed again via a spring. The dog clutch and the friction clutch are actuated here via a common shift drum arrangement and, for example, via a shift lever. The shift drum arrangement is driven here via an electromotive actuator.

The parking brake function of the transmission is realized by the fact that the shift drum arrangement is rotated into a setting in which the two shift elements, i.e. the dog clutch and the friction clutch, are closed. The first gear and the second gear are then simultaneously engaged, and the transmission is braced in such a manner that the output shaft of the transmission is blocked and a parking brake is realized. This is advantageous on account of the spring-actuated friction clutch and the self-locking kinematics of the shift drum because, as a result, no retaining forces by means of the electromotive actuator are required in the parking brake setting.

However, for safety reasons, it is necessary to mechanically prevent the parking brake from being able to be engaged in the driving mode by means of an unintentional activation of the actuator, which would have the consequence of an unsafe driving state with blocked drive wheels.

SUMMARY OF THE INVENTION

The invention relates to a shift drum arrangement which permits setting of a parking brake function, wherein it is mechanically prevented at the same time that the parking brake function is engaged unintentionally, as well as a correspondingly improved transmission.

An exemplary embodiment of the invention relates to a shift drum arrangement with a shift drum with at least one first shift gate and/or a shift drum path for actuating at least one shift element of a transmission, in particular of a motor vehicle, with a blocking device having a blocking gate and having a blocking pin which engages in the blocking gate, wherein the blocking gate has a labyrinth contour, and therefore the blocking pin strikes against a stop contour in one direction of rotation of the shift drum and blocks the further rotation of the shift drum, wherein the block is released after the shift drum is partially rotated back in the reverse direction of rotation. The effect achieved by this is that a double change in direction of rotation leads to the brake being overcome, this being extremely unlikely in the event of a defect and in the event of an intentional actuation of the shift drum.

The wording to the effect that the blocking pin strikes against a stop contour in one direction of rotation of the shift drum here means that the shift drum rotates and a stop contour of the shift drum moves against a fixed blocking pin and strikes there and therefore the movement of the shift drum is stopped. Overall, the relative movement of the shift drum in relation to the blocking pin is of significance here, wherein customarily the shift drum rotates while the blocking pin is stationary. As a result, however, the blocking pin moves relative to the shift drum and can achieve the described actions.

It is particularly advantageous if the blocking pin is part of a blocking lever which is loaded into the blocking gate in the axial direction of the shift drum and optionally in the radial direction of the shift drum. As a result, the blocking pin moves with the blocking lever along the blocking gate and is controlled and optionally blocked by the latter.

It is particularly advantageous if the blocking pin is of spring-loaded design or is of spring-elastic design. This results in a defined contact of the blocking pin against a side surface of the gate path.

It is also advantageous if the labyrinth contour defines or restricts or releases the path of movement of the blocking cam in the blocking gate by means of guides and therefore in particular restricts or releases the rotational movement of the shift drum.

It is particularly advantageous if the blocking gate is designed in such a manner that the blocking pin is guided past the labyrinth contour by a bypass gate in the opposite direction of rotation of the shift drum. The blocking pin is thus blocked only in one direction of rotation.

It is advantageous if the blocking gate has a respective path branch upstream and downstream of the labyrinth contour. It is thereby possible to prevent movement along an incorrect gate path.

It is also advantageous if the blocking element is guided at the gate path branch by means of a switch-type flap. This is a reliable possibility, with it being possible for the outlay on the switch-type flap to be low.

It is also advantageous if the blocking element is guided at the gate path branch by means of a lateral guide contour of the gate path, said guide contour being produced by a different groove depth of the gate path.

An exemplary embodiment of the invention relates to a transmission with a shift drum arrangement according to aspects of the invention, wherein at least a first gear and a second gear can be shifted in the transmission by means of the shift drum arrangement, wherein the blocking device prevents an unintentional engagement of a parking brake.

It is advantageous here if one of the gears of the first gear and second gear can be shifted by means of a dog clutch, and in that the other gear of the first gear and second gear can be shifted by a friction clutch.

BRIEF DESCRIPTION OF THE DRAWING FIGURES

Figures 2, 3:
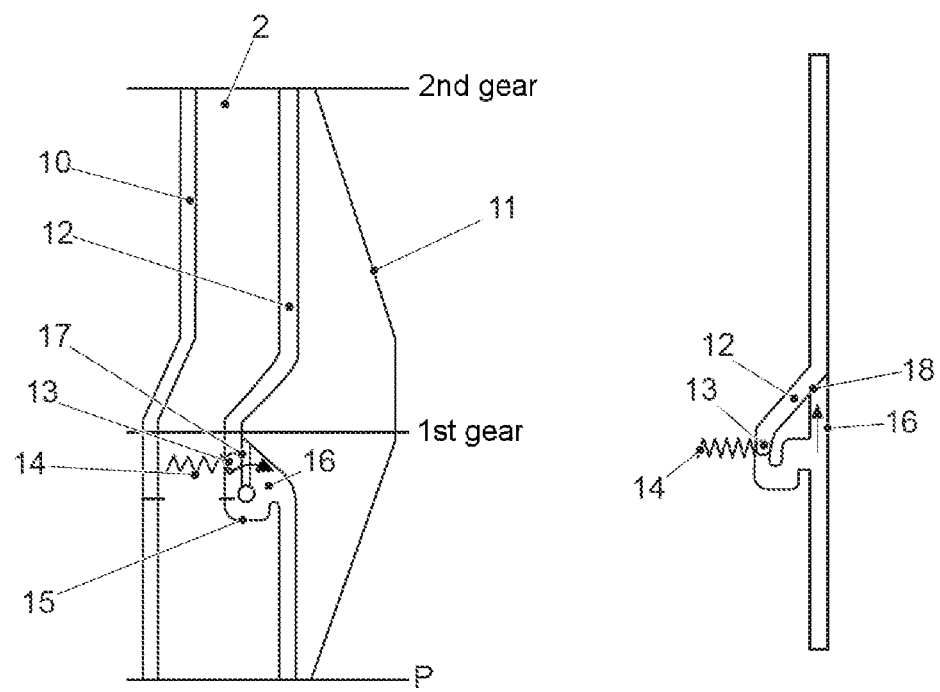
Figure 4:
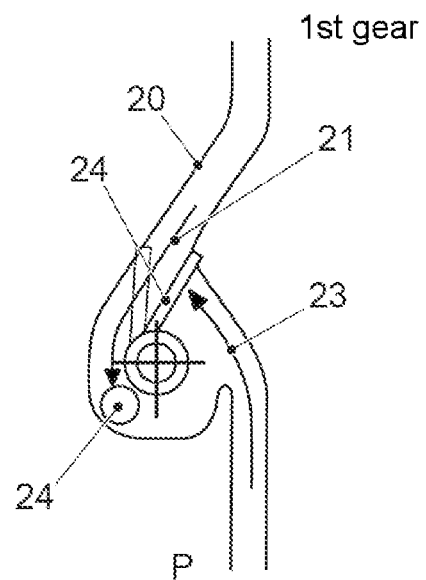
Figure 5:
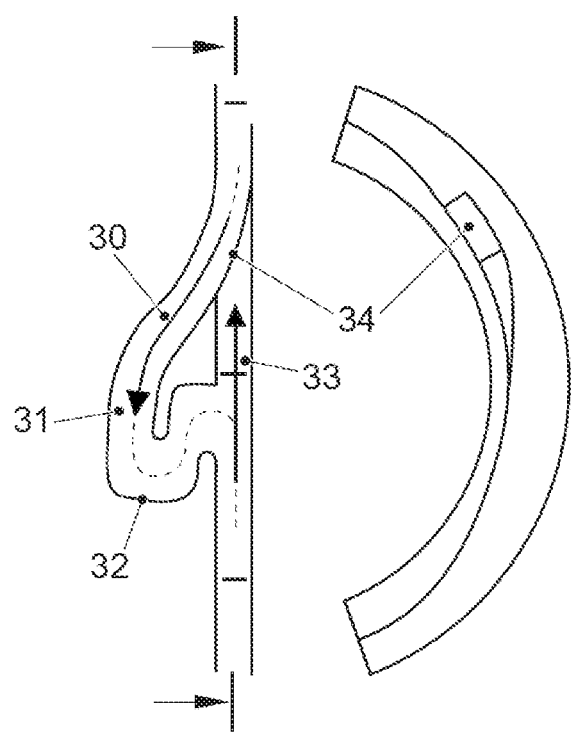
Figure 7:
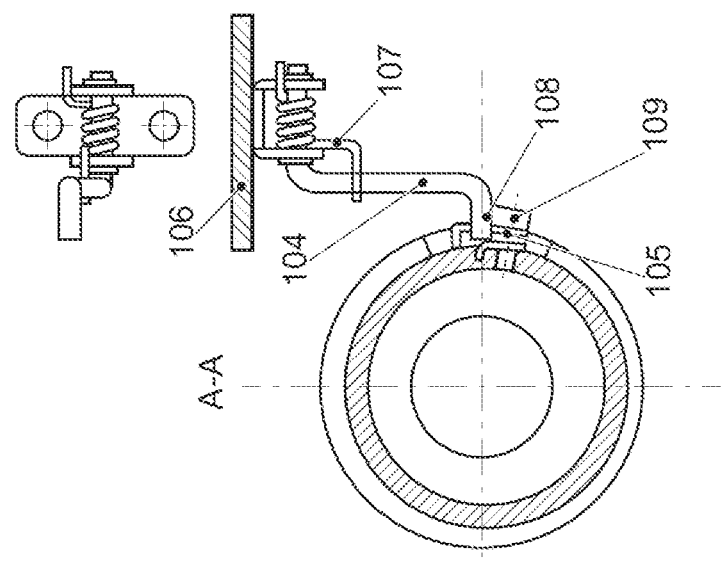
Figure 6:
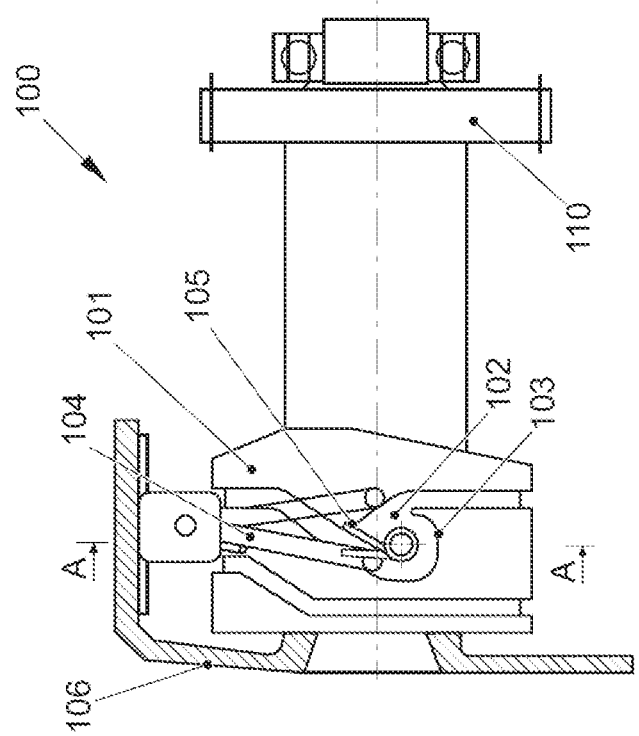
Figure 10:
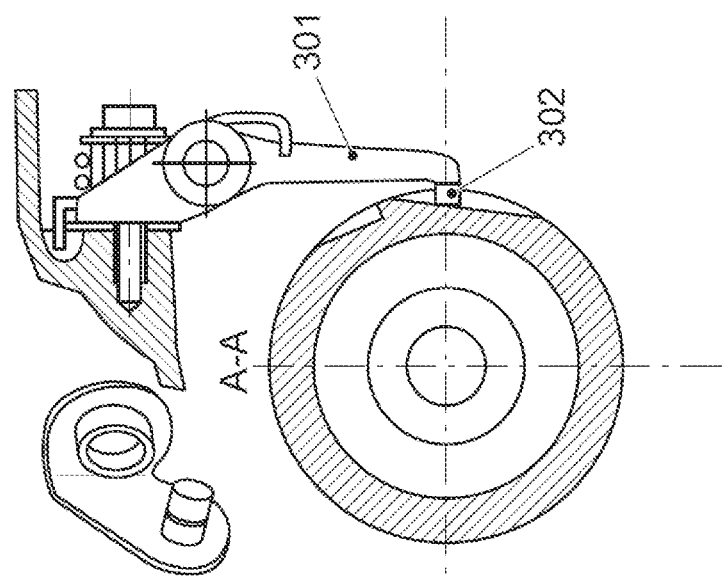
Figure 11:
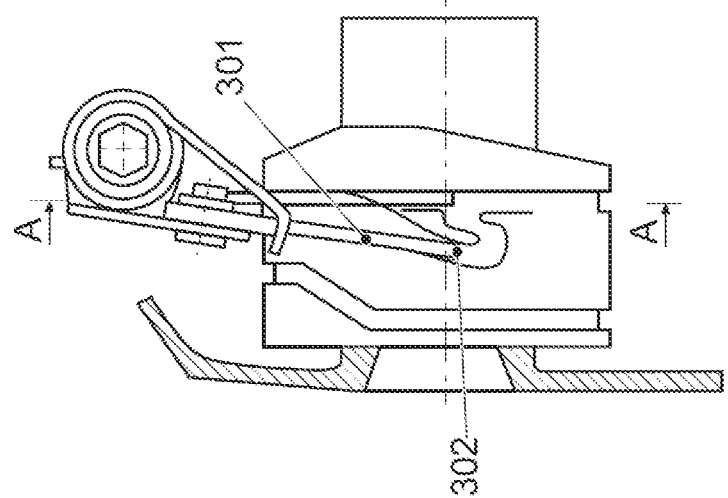

The invention is explained in detail below using an exemplary embodiment with reference to the drawing. In the drawing:

FIG. 1 shows a schematic view of a shift drum arrangement in order to explain the invention, FIG. 2 shows a schematic view of a gate path of a shift drum arrangement in order to explain the invention, FIG. 3 shows a schematic view of a gate path of a shift drum arrangement in order to explain the invention, FIG. 4 shows a schematic view of a gate path of a shift drum arrangement in order to explain the invention, FIG. 5 shows a schematic view of a gate path of a shift drum arrangement in order to explain the invention, FIG. 6 shows a schematic view of an exemplary embodiment of a shift drum arrangement, FIG. 7 shows an alternative schematic view of the exemplary embodiment of a shift drum arrangement according to FIG. 6, FIG. 8 shows a schematic view of a further exemplary embodiment of a shift drum arrangement, FIG. 9 shows an alternative schematic view of the exemplary embodiment of a shift drum arrangement according to FIG. 8, FIG. 10 shows a schematic view of a further exemplary embodiment of a shift drum arrangement, FIG. 11 shows an alternative schematic view of the exemplary embodiment of a shift drum arrangement according to FIG. 10, FIG. 12 shows a schematic view of a further exemplary embodiment of a shift rum arrangement, FIG. 13 shows an alternative schematic view of the exemplary embodiment of a shift drum arrangement according to FIG. 12, and FIG. 14 shows an alternative schematic view of the exemplary embodiment of a shift drum arrangement according to FIG. 12.

DETAILED DESCRIPTION OF THE INVENTION

The invention relates to a shift drum arrangement, in particular for motor vehicles and furthermore in particular for electric vehicles or hybrid vehicles with an electric motor and with an internal combustion engine as the drive, wherein the shift drum arrangement is provided in order to shift a transmission and in order to actuate the parking brake.

The transmission is, for example, a two-speed transmission which can be shifted in an automated manner. The transmission has, for example, two shift elements for shifting the first gear and for shifting the second gear. The shift element here for the first gear is, for example, an overrunning clutch which can be shifted via a dog clutch. The shift element for the second gear is, for example, a friction clutch which is opened via the shift drum arrangement and which is closed again via a spring. The dog clutch and the friction clutch are actuated here via a common shift drum arrangement and, for example, via a respective shift lever which is loaded by the shift drum arrangement. The shift drum arrangement is driven, for example rotated, here via an electromotive actuator. According to the concept of the invention, the shift drum is rotated such that gates or guides of the shift drum are movable relative to other elements which, for example, are stationary. This results in a relative movement of the shift drum with its features in relation to stationary elements. Contact with each other is then referred to, for example, as striking against each other, even if the shift drum moves relative to a stationary element.

The parking brake function of the transmission is preferably realized by the fact that the shift drum arrangement is rotated into a setting in which the two shift elements, i.e. the dog clutch and the friction clutch, are closed. The first gear and the second gear are then simultaneously engaged, and the transmission is braced in such a manner that the output shaft of the transmission is blocked and a parking brake is realized. This is advantageous on account of the spring-actuated friction clutch and the self-locking kinematics of the shift drum because, as a result, no retaining forces by means of the electromotive actuator are required in the parking brake setting.

FIG. 1 shows schematically a shift drum arrangement 1 with a shift drum 2 and a blocking pin 3. The blocking pin 3 is loaded in the axial direction by a spring 4, from the left to the right in FIG. 1. A labyrinth guide 5 is provided on the circumference of the shift drum 2, said labyrinth guide being formed by two L-shaped guides 6 which are arranged in such a manner that an S-shaped path 7 through the labyrinth guide 5 arises.

The shift drum can be rotated here in steps in order to guide the blocking pin through the labyrinth guide.

In a first step, step 1, the shift drum 2 is rotated in the direction of the parking brake position as far as a defined first position. In said first position, a guide 6 mounted on the shift drum releases the path for the blocking pin 3 which, under spring loading, moves axially parallel to the shift drum 2 into the labyrinth guide 5 as far as a stop of the guide.

In a further step, step 2, the shift drum 2 is rotated rearward as far as a defined second position. In said second position, the labyrinth guide 5 releases the path for the blocking pin 3 which moves further axially parallel as far as a third position relative to the shift drum, in which the labyrinth guide 5 releases the rotational path for the shift drum 2.

In a further step, step 3, the shift drum 2 is rotated into the parking brake position by the actuator.

As a safety concept, it is provided that, in the case in which the actuator is activated inadvertently, for example by means of a short circuit, because of a lack of reverse rotational activation, the rotational movement of the shift drum 2 is stopped by the stop of the blocking pin 3 in the labyrinth guide 5 before the parking brake position is reached.

FIGS. 2 and 3 show further schematic illustrations in which the shift drum 2 is shown by way of explanation. The shift drum 2 has a shift gate 10 for shifting the first gear. A shift drum path 11 for actuating the friction clutch for the second gear is also provided. A blocking gate 12 is furthermore provided.

The shift drum 2 therefore has a labyrinth-like blocking gate 12 in which a blocking pin 13 which is supported on the transmission housing and which can also be designed as a blocking lever is guided non-positively. For this purpose, the spring 14 which loads the blocking pin 13 is provided. By means of the shaping of the blocking gate 12, when the direction of rotation remains the same, the blocking pin comes into contact with a stop contour 15 of the blocking gate 12, i.e. the guide 6, and therefore, in the event of a malfunction, an inadvertent rotation of the shift drum 2 into the parking brake position is prevented.

A controlled shifting from the first gear to the parking brake position P therefore requires a shifting movement of the shift drum 2 with a double change in direction.

After a short shifting path of the shift drum 2 in the direction of the parking brake position P, the opening of the gate labyrinth reaches the blocking pin 13 of the blocking lever. At this point, the shift drum 2 actively undergoes a reversal in the direction of rotation. After a short reversing rotational path of the shift drum, the shift drum 2 again undergoes a reversal in the direction of rotation and finally shifts into the parking brake position P. The blocking pin is guided through the labyrinth by means of this double reversal of the direction of rotation of the shift drum.

The reversing points of the rotation of the shift drum are advantageously and optionally selected in such a manner that the blocking pin 13 of the blocking lever moves through the labyrinth guide 5 in an axially parallel direction to the axis of rotation of the shift drum 2 by means of spring forces and subsequently is no longer opposite any stop which would obstruct the rotation of the shift drum 2.

During the shifting from P to 1, the blocking cam, because of a rotation of the shift drum, comes into contact with a return gate path 16 which guides the blocking pin 13 around the labyrinth contour. The return gate path 16 meets the gate path 12 above the labyrinth at the beginning of the shifting operation.

During a movement of the shift drum 2 from the position of the first gear to the position of the parking brake P, the labyrinth contour therefore forms a stop at the beginning of the shifting path, against which stop the blocking pin strikes and prevents the further rotation of the shift drum.

The blocking pin or a blocking cam is arranged fixed on the transmission housing and movably in an axially parallel manner with respect to the axis of rotation of the drum. The blocking pin is of spring-loaded design in the axial and radial direction.

The different configuration of the blocking gate and of the return gate path brings about a different course of the blocking pin depending on the direction of rotation. So that the blocking pin moves in the respective blocking gate or in the return gate path during rotation of the shift drum, the branch of the gate path is formed by a switch-type flap 17, see FIG. 2, or by a jump 18 in the groove depth of the gate path, see FIG. 3.

FIG. 4 shows a further exemplary embodiment which substantially corresponds to the exemplary embodiment of FIG. 2.

In the region of the convergence of the forward path 21 and of the return path 22, the blocking gate 20 has a flap 23 which, in a spring-actuated manner similarly to a switch, defines the path from the first gear after P toward the stop. During the rotation of the shift drum from P to 1, the pin presses onto the rear side of the flap 23 and impinges upon the gate path or the forward path 21 upstream of the stop. The spring force on the blocking pin 24 takes place transversely with respect to the gate path.

FIG. 5 shows an exemplary embodiment which substantially corresponds to that of FIG. 3. On the path 31 to the stop position 32 and around the latter, the blocking gate 30 has a lower groove base than the returning gate path 33 past the stop. The returning gate path 33 has a rising groove base. At the convergence of the forward and return gate path, an increment 34 runs through the differing groove depth. Said increment is the guide contour which guides the stop pin or stop lever onto the path in the direction of the stop. The spring force against the blocking pin takes place transversely with respect to the gate path and in the radial direction with respect to the groove base.

FIGS. 6 to 14 show various views of different exemplary embodiments of shift drum arrangements.

FIGS. 6 and 7 show an exemplary embodiment of a shift drum arrangement 100 with a shift drum 101 having a gate path 102 with a stop 103 in the one direction of movement, in which gate path a blocking lever 104 engages in a movable manner. Arranged in the gate path 102 is a leg spring 107 in the form of a switch-type flap 105 which is arranged in the gate path itself. The blocking lever 104 is mounted rotatably on the transmission housing 106 and is loaded via a leg spring 107. At the end of the blocking lever, the blocking lever 104 has a blocking cam or blocking pin 108 which engages in the gate path.

FIG. 7 also shows that the leg spring is fastened and mounted in the gate path by means of a screw 109.

Furthermore, a drive wheel 110 of the shift drum 101 can be seen, by means of which drive wheel the shift drum can be driven by an electric motor as an actuator.

FIGS. 8 and 9 show an exemplary embodiment of a shift drum arrangement 200 with a shift drum 201 with a gate path 202 and with a stop 203 in the one direction of movement, in which gate path a blocking lever 204 movably engages.

In the gate path 202, a different groove depth is realized for the forward gate path 205 and for the return gate path 206. The blocking lever 204 is mounted rotatably on the transmission housing 210 and is loaded via a leg spring 207. At the end of the blocking lever 204, the blocking lever 204 has a blocking cam or blocking pin 208 which engages in the gate path 202.

The gate path 205 leading to the stop 203 is formed here with a deeper groove base than the returning gate path 206. The blocking lever 204 is also loaded here by the leg spring toward the groove base such that the blocking pin moves along the groove base. For this purpose, the blocking lever 204 is mounted by means of a pivot bearing 211 with a bearing bushing 212.

FIGS. 10 and 11 show an exemplary embodiment which substantially corresponds to the exemplary embodiment of FIGS. 8 and 9. However, the blocking lever 301 here is manufactured as a punched sheet metal part and, at its end, has a plastics coating 302 as the blocking pin. All other elements correspond to the elements explained with respect to FIGS. 8 and 9.

FIGS. 12 to 14 show an exemplary embodiment which substantially corresponds to the exemplary embodiment of FIGS. 8 and 9 or 10 and 11. However, the blocking lever 401 here is manufactured as a punched part from spring steel and has elasticity in two directions, and therefore it is loaded resiliently against the groove base of the gate path and is also loaded in the axial direction, and therefore the leg spring of the previous exemplary embodiments can be omitted. The blocking lever 401 has, at its end, a plastics coating 402 as the blocking pin.

The blocking lever 401 has a first region 403 which is of resilient design in the radial direction. The blocking lever 401 also has a second region 404 which is of resilient design in the axial direction.

All other elements correspond to the elements explained with respect to FIGS. 8 and 9.

The exemplary embodiments each show a shift drum arrangement which has a blocking device, wherein the blocking device can be deactivated. The shift drum block is deactivated by a twin change in the direction of rotation of the shift drum during a shifting operation from one shift position to a next shift position. The shift drum block is provided between the shift position of the first gear and the parking brake position P.

The blocking element firstly provides a block against a blocking gate fixed on the shift drum and secondly against the transmission housing.

The blocking element is loaded via a spring action of a spring against a side wall of the gate path and, depending on the exemplary embodiment, optionally also additionally against the groove base of the gate path.

For simple configuration, the gate path from the first gear toward the parking brake position P is designed as a labyrinth, for example is designed with a S-shaped path.

So that the return path is not blocked, the gate path from P to the first gear is designed as a bypass path around the labyrinth contour.

To achieve the described functionality, the blocking element moves during shifting through the labyrinth contour of the blocking gate by a forward and reverse rotational movement of the shift drum.

During shifting from P to the first gear, the blocking element is guided along the bypass of the gate path with a uniform rotational movement of the shift drum.

Exemplary embodiments show that the blocking gate in each case has a path branch upstream and downstream of the labyrinth contour. In some exemplary embodiments, the blocking element is guided at the gate path branch by means of a switch-type flap. Said switch-type flap can be designed, for example, as a leg spring. A screw or a bolt can serve here as a mounting of the leg spring.

The blocking element is alternatively guided at the gate path branch by means of a lateral guide contour of the gate path, said guide contour being produced by a different groove depth of the gate path.

The groove depth from P to the first gear can be designed here in a harmoniously rising manner, with a jump in the groove depth being present at the groove branch.

The blocking gate path can advantageously be formed in an encircling manner on the circumference of the shift drum.

The blocking gate path can also be formed only in the blocking region of the shift drum.

The blocking element is preferably designed as a movably mounted blocking lever. The blocking lever can be mounted movably here in two planes via a pivot bearing. The blocking lever is preferably loaded both against the side wall of the gate path and also against the groove base of the gate path by a spring, such as, for example, a leg spring.

Alternatively, the blocking lever can be designed as a stationary, resilient component.

The blocking lever is advantageously designed resiliently from spring steel in one plane or in two planes, for example as a bent angular sheet.

The blocking lever is advantageously formed integrally with a blocking cam contour or blocking pin contour, for example as a punched sheet.

The blocking contour of the blocking lever can optionally be surrounded with a coating which reduces the coefficient of friction, for example can be coated or insert molded with a plastic.

LIST OF REFERENCE NUMBERS

1 Shift drum arrangement
2 Shift drum
3 Blocking pin
4 Spring
5 Labyrinth guide
6 Guide
7 S-shaped path
10 Shift gate
11 Shift drum path
12 Blocking gate
13 Blocking pin
14 Spring
15 Stop contour
16 Gate path
17 Switch-type flap
18 Jump
20 Blocking gate
21 Forward path
22 Return path
23 Flap
24 Blocking pin
30 Blocking gate
31 Path
32 Stop position
33 Gate path
34 Increment
100 Shift drum arrangement
101 Shift drum
102 Gate path
103 Stop
104 Blocking lever
105 Switch-type flap
106 Transmission housing
107 Leg spring
108 Blocking cam or blocking pin
109 Screw
110 Drive wheel
200 Shift drum arrangement
201 Shift drum
202 Gate path
203 Stop
204 Blocking lever
205 Forward gate path
206 Return gate path
207 Leg spring
208 Blocking cam or blocking pin
210 Transmission housing
211 Pivot bearing
212 Bearing bushing
301 Blocking lever
302 Plastics coating
401 Blocking lever
402 Plastics coating
403 First region
404 Second region

What is claimed is:

1. A shift drum arrangement comprising:
a shift drum with at least one first shift gate or a shift drum path for actuating at least one shift element of a vehicle transmission,
a blocking device having a blocking gate and having a blocking pin which engages in the blocking gate, wherein the blocking gate has a labyrinth contour,
wherein the blocking pin is configured to strike against a stop contour in one direction of rotation of the shift drum and block further rotation of the shift drum, and
wherein the blocking pin is configured to be released after the shift drum is partially rotated back in a reverse direction of rotation and then the blocking pin is configured to reach a parking position after the shift drum is rotated back in said one direction of rotation of the shift drum.

2. A shift drum arrangement comprising:
a shift drum with at least one first shift gate or a shift drum path for actuating at least one shift element of a vehicle transmission,
a blocking device having a blocking gate and having a blocking pin which engages in the blocking gate, wherein the blocking gate has a labyrinth contour,
wherein the blocking pin is configured to strike against a stop contour in one direction of rotation of the shift drum and block further rotation of the shift drum, and wherein the blocking pin is configured to be released after the shift drum is partially rotated back in a reverse direction of rotation, wherein the blocking pin is part of a blocking lever which is loaded into the blocking gate in an axial direction of the shift drum or in the radial direction of the shift drum.

3. The shift drum arrangement as claimed in claim 2, wherein the blocking pin is of spring-loaded design or is of spring-elastic design.

4. The shift drum arrangement as claimed in claim 1, wherein the labyrinth contour defines or restricts or releases a path of movement of the blocking pin in the blocking gate by guides and therefore restricts or releases a rotational movement of the shift drum.

5. The shift drum arrangement as claimed in claim 1, wherein the blocking pin is guided past the labyrinth contour by a bypass gate in the reverse direction of rotation of the shift drum.

6. The shift drum arrangement as claimed in claim 1, wherein the blocking gate has a respective path branch upstream and downstream of the labyrinth contour.

7. The shift drum arrangement as claimed in claim 1, wherein the blocking pin is guided at a gate path branch by a switch-type flap.

8. The shift drum arrangement as claimed in claim 1, wherein the blocking pin is guided at a gate path branch by a lateral guide contour of the gate path, said lateral guide contour having a different groove depth than another segment of the gate path.

9. A transmission with the shift drum arrangement as claimed in claim 1, wherein at least a first gear and a second gear are configured to be shifted in the transmission by the shift drum arrangement, and wherein the blocking device prevents an unintentional engagement of a parking brake.

10. The transmission as claimed in claim 9, wherein one of the gears of the first gear and the second gear is configured to be shifted by a dog clutch, and the other gear of the first gear and the second gear is configured to be shifted by a friction clutch.

* * * * *